(12) United States Patent
Tajima et al.

(10) Patent No.: US 10,644,526 B2
(45) Date of Patent: May 5, 2020

(54) CHARGER WITH INVERTER AND INVERTER GATE DRIVE CIRCUIT

(71) Applicant: FUJI ELECTRIC CO., LTD., Kawasaki-shi (JP)

(72) Inventors: Hirokazu Tajima, Suzuka (JP); Osamu Takei, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 499 days.

(21) Appl. No.: 15/176,649

(22) Filed: Jun. 8, 2016

(65) Prior Publication Data
US 2016/0285297 A1 Sep. 29, 2016

Related U.S. Application Data

(63) Continuation of application No. PCT/JP2014/064185, filed on May 28, 2014.

(51) Int. Cl.
*H02J 7/00* (2006.01)
*H02M 1/08* (2006.01)
(Continued)

(52) U.S. Cl.
CPC .......... *H02J 7/0072* (2013.01); *H02J 7/0068* (2013.01); *H02J 7/022* (2013.01); *H02M 1/08* (2013.01);
(Continued)

(58) Field of Classification Search
CPC .................................................... H02J 7/0072
See application file for complete search history.

(56) References Cited

U.S. PATENT DOCUMENTS 9,166,499 B2 10/2015 Suzuki et al.
2010/0309589 A1 12/2010 Ueki et al.
(Continued)

FOREIGN PATENT DOCUMENTS

| JP | 1-303065 | 12/1989 |
|----|----------|---------|
| JP | 2004-282926 | 10/2004 |

(Continued)

OTHER PUBLICATIONS

International Search Report dated Aug. 26, 2014, in corresponding International Application No. PCT/JP2014/064185.
(Continued)

*Primary Examiner* — Richard V Muralidar (57) ABSTRACT

A high-speed charger with a long lifespan such that a power converting inverter can be reliably stopped in accordance with a forced stop signal, without causing a malfunction. Pulse transformers corresponding respectively to switching elements configure an inverter. A control circuit outputs gate signals for switching on and off the switching elements to primary side circuits, each of which includes a primary winding of one of the pulse transformers. Gate drive circuits switch on and off of the switching elements based on voltage generated in secondary windings of the pulse transformers. Transistors acting as interruption control switching elements are interposed in the primary side circuit of each of the pulse transformers. The transistors are cut off in accordance with a forced stop signal, whereby an operation of the inverter stops.

11 Claims, 5 Drawing Sheets

(51) Int. Cl.
*H02M 1/36* (2007.01)
*H02M 3/337* (2006.01)
*H02J 7/02* (2016.01)
*H02M 1/084* (2006.01)

(52) U.S. Cl.
CPC ............. *H02M 1/36* (2013.01); *H02M 3/337* (2013.01); *H02M 1/084* (2013.01)

(56) References Cited

U.S. PATENT DOCUMENTS

| | | |
|---|---|---|
| 2012/0281444 A1 | 11/2012 | Dent |
| 2013/0039097 A1* | 2/2013 | Watanabe ............... H02M 1/44 363/21.01 |

FOREIGN PATENT DOCUMENTS

| | | |
|---|---|---|
| JP | 2005-110397 | 4/2005 |
| JP | 2007-66725 | 3/2007 |
| JP | 2010-284051 | 12/2010 |
| JP | 2014-073055 | 4/2014 |

OTHER PUBLICATIONS

Extended European Search Report dated Jun. 9, 2017 in corresponding European Patent Application No. 14893050.6.
Notification of Reason for Refusal for Japanese Application No. 2016-523034 dated May 10, 2017.

* cited by examiner

CHARGER WITH INVERTER AND INVERTER GATE DRIVE CIRCUIT

CROSS-REFERENCE TO RELATED APPLICATIONS

This application is a continuation application, filed under 35 U.S.C. § 111(a), of International Application PCT/JP2014/064185 filed on May 28, 2014, the entire contents of which are hereby incorporated by reference.

BACKGROUND

1. Field

The present disclosure relates to a charger preferred as a vehicle-mounted charger or the like.

2. Related Art

There is a vehicle-mounted charger such that alternating current voltage is generated by an inverter, and direct current voltage for charging a storage battery inside the vehicle is generated by the alternating current voltage being rectified. As is commonly known, an inverter is a circuit wherein direct current voltage is converted into alternating current voltage by a multiple of switching elements carrying out switching operations. As a charger in which this kind of inverter is mounted can regulate output current by controlling the pulse width of a gate signal supplied to each switching element of the inverter, there is an advantage in that the charging current can easily be controlled in accordance with the state of charge of the storage battery.

It may happen that the need arises to stop the charging operation suddenly during charging of a storage battery by a charger in order to prevent, for example, an electrocution accident or the like. Herein, when the charger includes an inverter as power conversion means, the charging operation can be stopped by stopping the output of the inverter.

As existing technology for stopping inverter output, there is technology that utilizes a logic circuit. In the case of this technology, a configuration is such that a gate signal is supplied via, for example, an AND gate to each switching element of the inverter. Further, when a forced stop signal for stopping the output of the inverter is generated, passage of the AND gate by the gate signal is impeded by the forced stop signal, whereby the inverter output is stopped. Hereafter, this technology will be referred to as first existing technology.

As other technology that stops inverter output, there is the technology disclosed in JP-A-2010-284051 ("JP '051"). In JP '051, a gate signal generated by a control circuit is supplied to each switching element of the inverter via a photocoupler. Further, in JP '051, the supply of the gate signal from the control circuit to each switching element of the inverter is interrupted by a power supply that supplies a bias current to a phototransistor of the photocoupler being interrupted in accordance with a forced stop signal, whereby inverter output is stopped. Hereafter, this technology will be referred to as second existing technology.

SUMMARY

Herein, when utilizing the first existing technology, it is necessary for an IC on which is mounted a logic circuit for switching between allowing through and interrupting the gate signal to be added to the charger, because of which there is a problem in that the failure rate of the charger increases.

Also, when causing the output of the charger inverter to be stopped by utilizing the second existing technology, the following problems occur. Firstly, the response speed of the photocoupler is low. Consequently, when a gate signal is supplied to the inverter via the photocoupler, there is a problem in that it is difficult to cause the inverter to carry out high-speed switching. Also, the lifespan of the photocoupler is short. Consequently, when the photocoupler is used in a charger, there is a problem in that the burden of maintenance, such as photocoupler replacement, increases together with the elapse of the service life. Also, a gate drive circuit, which amplifies a gate signal supplied via the photocoupler to an appropriate level and supplies the gate signal to each switching element, is provided in the inverter. When the gate drive circuit has a power supply differing from that of the photocoupler, it may happen that, when transmission of the gate signal via the photocoupler is interrupted in accordance with a forced stop signal, the gate drive circuit erroneously causes the inverter switching elements to be turned on due to a circuit failure.

The disclosure, having been contrived in consideration of the heretofore described situation, has an object of providing a high-speed charger with a long lifespan such that a power converting inverter can be reliably stopped in accordance with a forced stop signal, without causing a malfunction.

The disclosure provides a charger that generates alternating current voltage using an inverter and generates direct current voltage for charging a storage battery by rectifying the alternating current voltage, the charger including a multiple of transformers corresponding one each to a multiple of switching elements configuring the inverter, a control circuit that outputs a multiple of gate signals for carrying out switching on and off of the multiple of switching elements of the inverter to a multiple of primary side circuits, each of which includes a primary winding of one of the multiple of transformers, a multiple of gate drive circuits that carry out switching on and off of the multiple of switching elements of the inverter based on voltage generated in secondary windings of the multiple of transformers, and a multiple of interruption control switching elements interposed one each in the primary side circuit of each of the multiple of transformers, wherein the multiple of interruption control switching elements are cut off in accordance with a forced stop signal, whereby the primary side circuit of each of the multiple of transformers is switched to an open state.

The charger is such that a control circuit outputs a multiple of gate signals, and voltage in accordance with each gate signal is generated in secondary windings of a multiple of transformers. A multiple of gate drive circuits carry out switching on and off of switching elements configuring an inverter based on the voltage generated in each secondary winding. As a result of this, alternating current voltage is output from the inverter. When a forced stop signal is generated, an interruption control switching element is cut off, whereby primary side circuits of the multiple of transformers are switched to an open state. As a result of this, voltage ceases to be output from the secondary winding of each transformer, and switching on and off of the multiple of switching elements by the multiple of gate drive circuits is stopped, whereby the output of alternating current voltage by the inverter is stopped. Because of this, charging of a storage battery is stopped.

According to the disclosure, a transformer is used as gate signal transmission means, because of which an increase in speed and an increase in lifespan of an inverter can be realized. Also, according to the disclosure, an output of voltage from secondary windings of a multiple of transformers is stopped when a forced stop signal is generated, whereby a supply of power to a multiple of gate drive circuits is interrupted. Consequently, an operation of the inverter can be reliably stopped, and charging stopped, in accordance with a forced stop signal, without causing a malfunction of the inverter.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Hereafter, embodiments of the disclosure will be described while referring to the drawings.

First Embodiment

Figure 1:
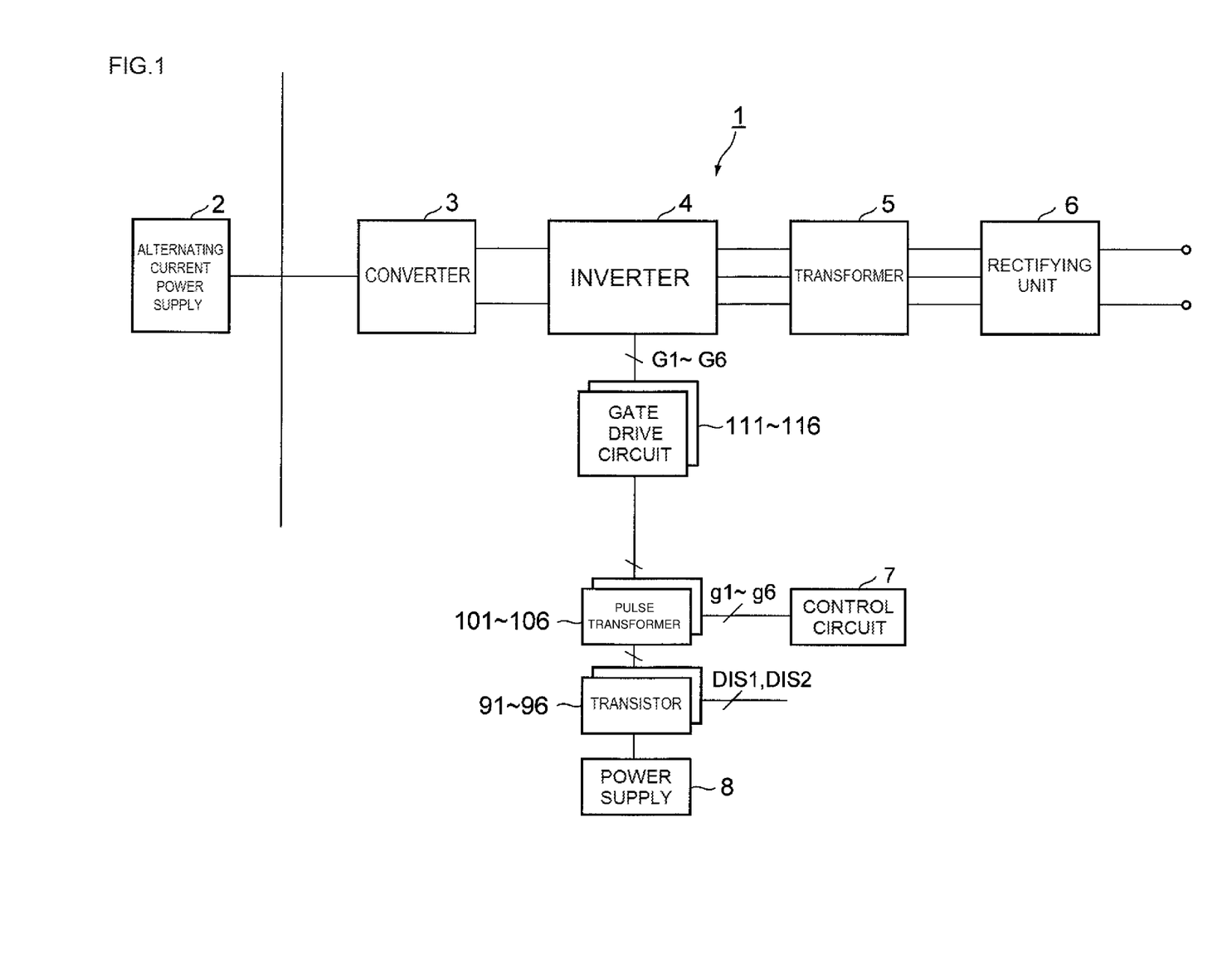
FIG. 1 is a block diagram showing a configuration of a vehicle-mounted charger, which is a first embodiment of the disclosure.

FIG. 1 is a block diagram showing a configuration of a vehicle-mounted charger 1, which is a first embodiment of the disclosure. The vehicle-mounted charger 1 has a converter 3, an inverter 4, a transformer 5, a rectifying unit 6, a control circuit 7, a power supply 8, transistors 91 to 96, pulse transformers 101 to 106, and gate drive circuits 111 to 116.

The converter 3 is a circuit that converts alternating current voltage output from an alternating current power supply 2 outside the vehicle into direct current voltage, and outputs the direct current voltage to the inverter 4. The converter 3 is configured of a rectifying element such as a diode.

The inverter 4 is a device that generates a pulse wave three-phase alternating current voltage by carrying out switching of the direct current voltage output by the converter 3. The transformer 5 has a three-phase primary winding and three-phase secondary winding magnetically coupled to each other. The pulse wave three-phase alternating current voltage output by the inverter 4 is applied to the three-phase primary winding of the transformer 5. Because of this, the transformer 5 outputs an approximately sinusoidal three-phase alternating current voltage from the secondary winding to the rectifying unit 6. The rectifying unit 6 is configured of a rectifier diode and smoothing capacitor, and generates direct current voltage by rectifying the three-phase alternating current voltage obtained from the three-phase secondary winding of the transformer 5. A storage battery in the vehicle, which is a charging target, is charged based on the direct current voltage output by the rectifying unit 6.

Figure 2:
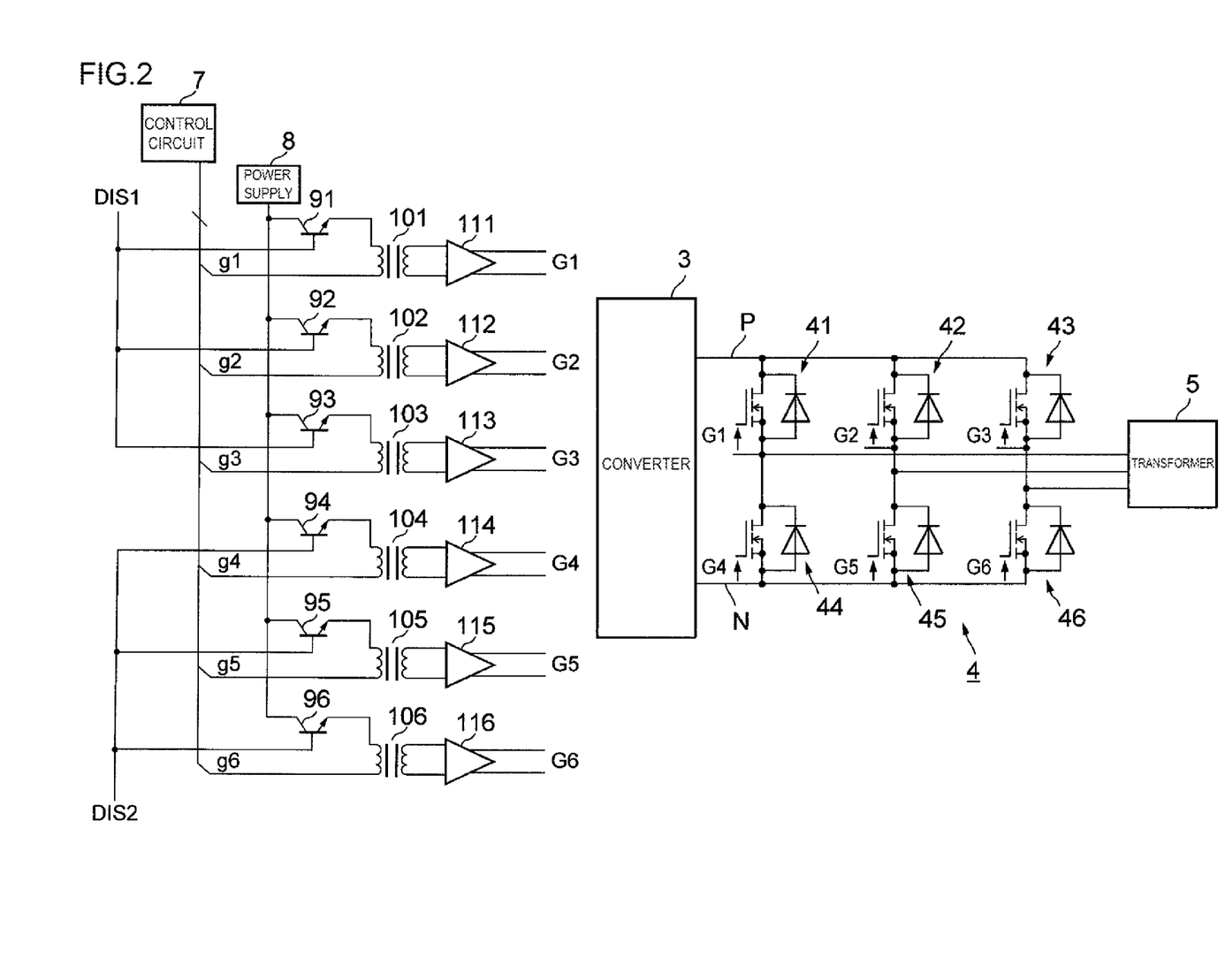
FIG. 2 is a circuit diagram showing a detailed configuration of an inverter and the like of the vehicle-mounted charger of the first embodiment.

FIG. 2 shows a detailed configuration of the inverter 4, control circuit 7, power supply 8, transistors 91 to 96, pulse transformers 101 to 106, and gate drive circuits 111 to 116 in FIG. 1. The circuit shown in FIG. 2 configures means of carrying out control of the switching on and off of switching elements configuring the inverter 4 in FIG. 1. In FIG. 2, the converter 3 of the stage before the inverter 4 is shown together with the inverter 4 in order to facilitate understanding of the function of the inverter 4.

In FIG. 2, the converter 3 outputs direct current voltage between a high potential power supply line P and a low potential power supply line N. The inverter 4 is configured of upper arm switching elements 41 to 43 and lower arm switching elements 44 to 46. Each of the upper arm switching elements 41 to 43 and lower arm switching elements 44 to 46 is configured of an n-channel FET (Field Effect Transistor) and freewheeling diode connected to each other in anti-parallel. The drain of each n-channel FET in the upper arm switching elements 41 to 43 is connected to the high potential power supply line P, while the source of each n-channel FET in the lower arm switching elements 44 to 46 is connected to the low potential power supply line N. Further, the sources of the n-channel FETs in the upper arm switching elements 41 to 43 are connected to the drains of the n-channel FETs in the lower arm switching elements 44 to 46 respectively, and these connection points are connected to the U-phase, V-phase, and W-phase primary windings respectively of the transformer 5.

The control circuit 7 is a circuit that generates gate signals g1 to g6, which form the basis of gate signals G1 to G6 supplied to the gates of the FETs of the upper arm switching elements 41 to 43 and lower arm switching elements 44 to 46 respectively. The control circuit 7 incorporates a PWM (Pulse Width Modulation) circuit, and outputs the gate signals g1 to g6 pulse width modulated by the PWM circuit based on a voltage command value.

The gate signals g1 to g6 are input by the control circuit 7 into primary side circuits including primary windings of the pulse transformers 101 to 106 respectively. To describe in further detail, one end of each of the primary windings of the pulse transformers 101 to 106 is connected to the end of the control circuit 7 that outputs the gate signals g1 to g6. Also, the other end of each of the primary windings of the pulse transformers 101 to 106 is connected to the emitters of the transistors (NPN transistors in this example) 91 to 96 respectively. Further, the collectors of the transistors 91 to 96 are connected to the power supply 8. Also, a forced stop signal DIS1 is input into the bases of the transistors 91 to 93, and a forced stop signal DIS2 is input into the bases of the transistors 94 to 96. Herein, the transistors 91 to 93 (94 to 96) are in an on-state when the forced stop signal DIS1 (DIS2) is at a non-active level (an H level in this example), thus connecting the power supply 8 to the primary windings of the pulse transformers 101 to 103 (104 to 106). Also, the transistors 91 to 93 (94 to 96) are in an off-state when the forced stop signal DIS1 (DIS2) is at an active level (an L level in this example), thus disconnecting the power supply 8 from the one end of the primary windings of the pulse transformers 101 to 103 (104 to 106). In this way, the transistors 91 to 96 function as interruption control switching elements.

In a preferred aspect, the forced stop signals DIS1 and DIS2 are, for example, generated in accordance with an operation or the like of an operator provided in a charging station on the exterior of the vehicle. In another preferred aspect, the forced stop signals DIS1 and DIS2 are generated based on a failure detection signal generated when a failure of the vehicle, auxiliary machinery of the vehicle, or the like, is detected. The two kinds of forced stop signal DIS1 and DIS2 are generated in order to duplicate means for stopping inverter output, thereby increasing safety.

The gate drive circuits 111 to 116 are circuits that rectify alternating current voltage generated in secondary windings of the pulse transformers 101 to 106 respectively, and output the gate signals G1 to G6 obtained as a result of the rectification between the gates and sources of the n-channel FETs of the switching elements 41 to 46 respectively of the inverter 4.

The above are the details of the configuration of the vehicle-mounted charger 1 according to this embodiment.

Next, an operation of this embodiment will be described. When the forced stop signals DIS1 and DIS2 are both at the non-active level (the H level in this example), each of the transistors 91 to 96 is in an on-state. In this state, voltage in accordance with the gate signals g1 to g6 output by the control circuit 7 is applied to the primary windings of the pulse transformers 101 to 106 respectively, and voltage in accordance with the gate signals g1 to g6 is output from the secondary windings of the pulse transformers 101 to 106 respectively. The gate drive circuits 111 to 116 rectify the voltages output from the secondary windings, and output the gate signals G1 to G6 obtained as a result of the rectification between the gates and sources of the n-channel FETs of the switching elements 41 to 46 respectively of the inverter 4. Because of this, switching on and off of the switching elements 41 to 46 of the inverter 4 is carried out, and three-phase alternating current voltage is output from the inverter 4. The three-phase alternating current voltage is supplied to the rectifying unit 6 via the transformer 5, and converted into direct current voltage by the rectifying unit 6. Further, charging of an unshown storage battery is carried out based on the direct current voltage.

When the forced stop signal DIS1 (DIS2) switches to the active level, each of the transistors 91 to 93 (94 to 96) switches to an off-state, and the power supply 8 is disconnected from the primary windings of the pulse transformers 101 to 103 (104 to 106). Because of this, the output of voltage from the secondary windings of the pulse transformers 101 to 103 (104 to 106) is stopped, whereby the output of the gate signals G1 to G3 (G4 to G6) from the gate drive circuits 111 to 113 (114 to 116) is stopped. Because of this, all of the upper arm switching elements 41 to 43 (all of the lower arm switching elements 44 to 46) of the inverter 4 switch to an off-state, whereby the output of alternating current voltage by the inverter 4 is stopped. As a result of this, charging of the storage battery is stopped.

The above are the details of the operation of the vehicle-mounted charger 1 according to this embodiment. According to this embodiment, the following advantages are obtained.

Firstly, the heretofore described first existing technology is such that it is necessary for an IC on which is mounted a logic circuit for switching between allowing through and interrupting the gate signal to be added to the charger, because of which there is a problem in that the failure rate of the charger increases.

As opposed to this, this embodiment is such that transformers are used as gate signal transmission means, because of which there is no need for such an IC on which a logic circuit is mounted to be provided in the charger. Consequently, the failure rate of the charger can be reduced.

Also, the heretofore described second existing technology is such that a photocoupler with low response speed and a short lifespan is used as gate signal transmission means, because of which there are problems in that it is difficult to cause the inverter to carry out high-speed switching, and the burden of maintenance, such as photocoupler replacement, increases together with the elapse of the service life.

As opposed to this, this embodiment is such that transformers with high response speed and a long lifespan are used as gate signal transmission means, because of which problems like those of the second existing technology do not occur.

Also, the heretofore described second existing technology is such that the power supply remains connected to the gate drive circuit when transmission of the gate signal via the photocoupler is interrupted in accordance with the forced stop signal, because of which input becomes unstable, the gate drive circuit oscillates, and there is a possibility that the inverter switching elements will be erroneously driven.

As opposed to this, this embodiment is such that the supply of power to the gate drive circuits 111 to 116 via the pulse transformers 101 to 106 is interrupted in accordance with a forced stop signal, because of which switching on and off of the switching elements 41 to 46 by the gate drive circuits 111 to 116 can be stopped. Consequently, the inverter 4 can be stopped in accordance with the forced stop signal, without causing an erroneous drive.

Also, this embodiment is such that the two forced stop signals DIS1 and DIS2 are generated in accordance with an operation of an operator, detection of a failure of the vehicle, or the like, all of the upper arm switching elements 41 to 43 of the inverter 4 are turned off by generation of the forced stop signal DIS1, and all of the lower arm switching elements 44 to 46 of the inverter 4 are turned off by generation of the forced stop signal DIS2. Herein, in order to stop the output of alternating current voltage from the inverter 4, it is sufficient that at least either all of the upper arm switching elements 41 to 43 or all of the lower arm switching elements 44 to 46 are turned off. However, when adopting a configuration wherein only one of the forced stop signals DIS1 and DIS2 is generated, the inverter cannot be stopped when a forced stop signal that should be generated is not generated because of a failure in the circuit that generates the forced stop signal, or the like, or when a failure occurs in the circuit that turns a switching element off based on a generated forced stop signal. Therefore, this embodiment is such that the two forced stop signals DIS1 and DIS2 are generated, and all of the upper arm switching elements 41 to 43 or all of the lower arm switching elements 44 to 46 are turned off in accordance with the forced stop signals DIS1 and DIS2 respectively. Consequently, according to this embodiment, the output of the inverter 4 can be stopped provided that at least one forced stop signal is generated, and at least either all of the upper arm switching elements 41 to 43 or all of the lower arm switching elements 44 to 46 are turned off in accordance with the forced stop signal. In this way, according to this embodiment, means of stopping the inverter 4 based on a forced stop signal is provided in duplicate, because of which a high degree of safety can be realized.

Second Embodiment

Figure 3:
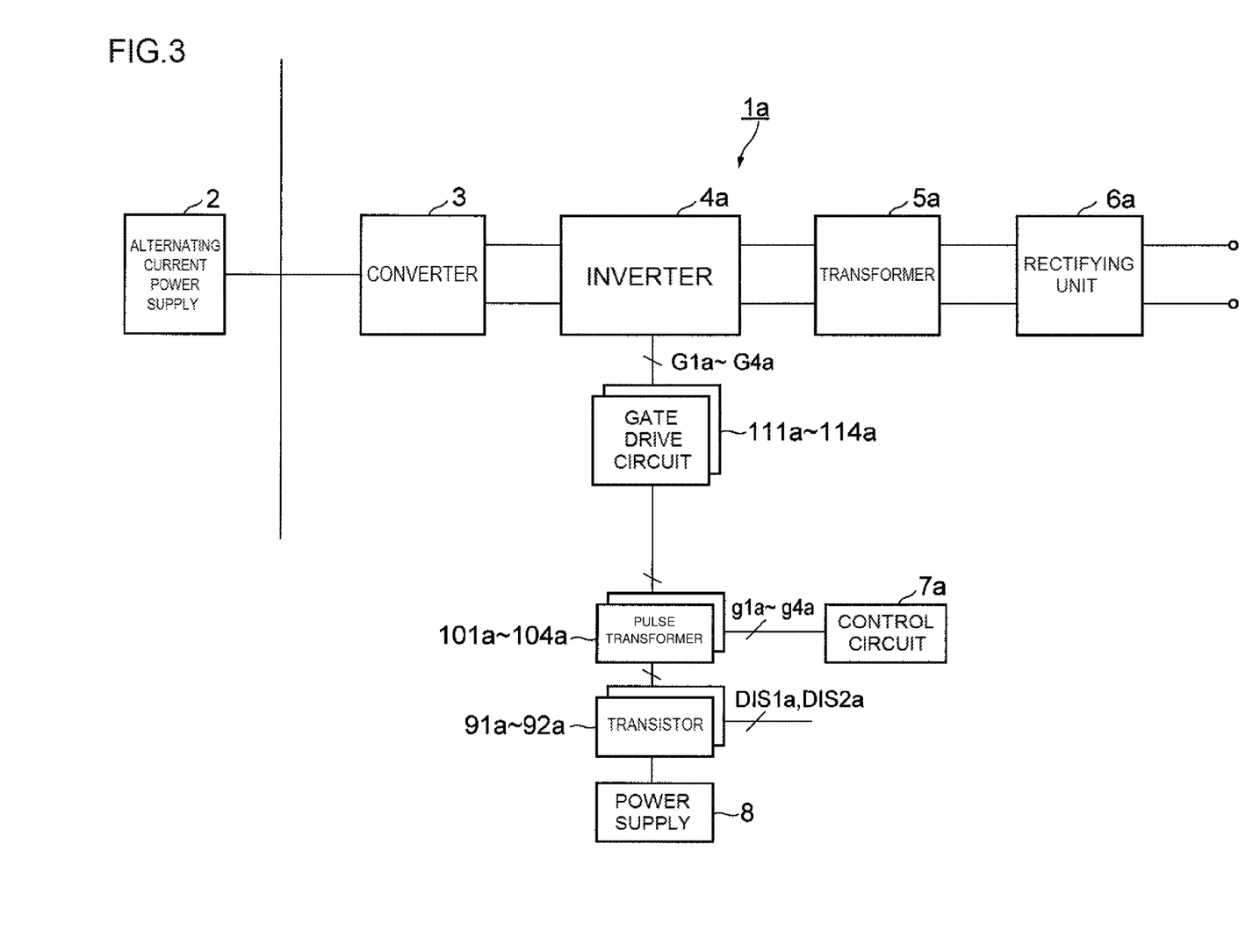
FIG. 3 is a block diagram showing a configuration of a vehicle-mounted charger, which is a second embodiment of the disclosure.

FIG. 3 is a block diagram showing a configuration of a vehicle-mounted charger 1a, which is a second embodiment of the disclosure. The vehicle-mounted charger 1a of this embodiment is such that the inverter 4 that generates three-phase alternating current voltage in the vehicle-mounted charger 1 of the first embodiment is replaced with an inverter 4a that generates single-phase alternating current voltage, the transformer 5 that transmits the three-phase alternating current voltage is replaced with a transformer 5a that transmits the single-phase alternating current voltage, and the rectifying unit 6 that rectifies the three-phase alternating current voltage is replaced with a rectifying unit 6a that rectifies the single-phase alternating current voltage. Also, together with this, this embodiment is such that the control circuit 7, transistors 91 to 96, pulse transformers 101 to 106, and gate drive circuits 111 to 116 in the first embodiment are replaced with the transformer 5a, the rectifying unit 6a, a control circuit 7a, transistors 91a and 92a, pulse transformers 101a to 104a, and gate drive circuits 111a to 114a.

Figure 4:
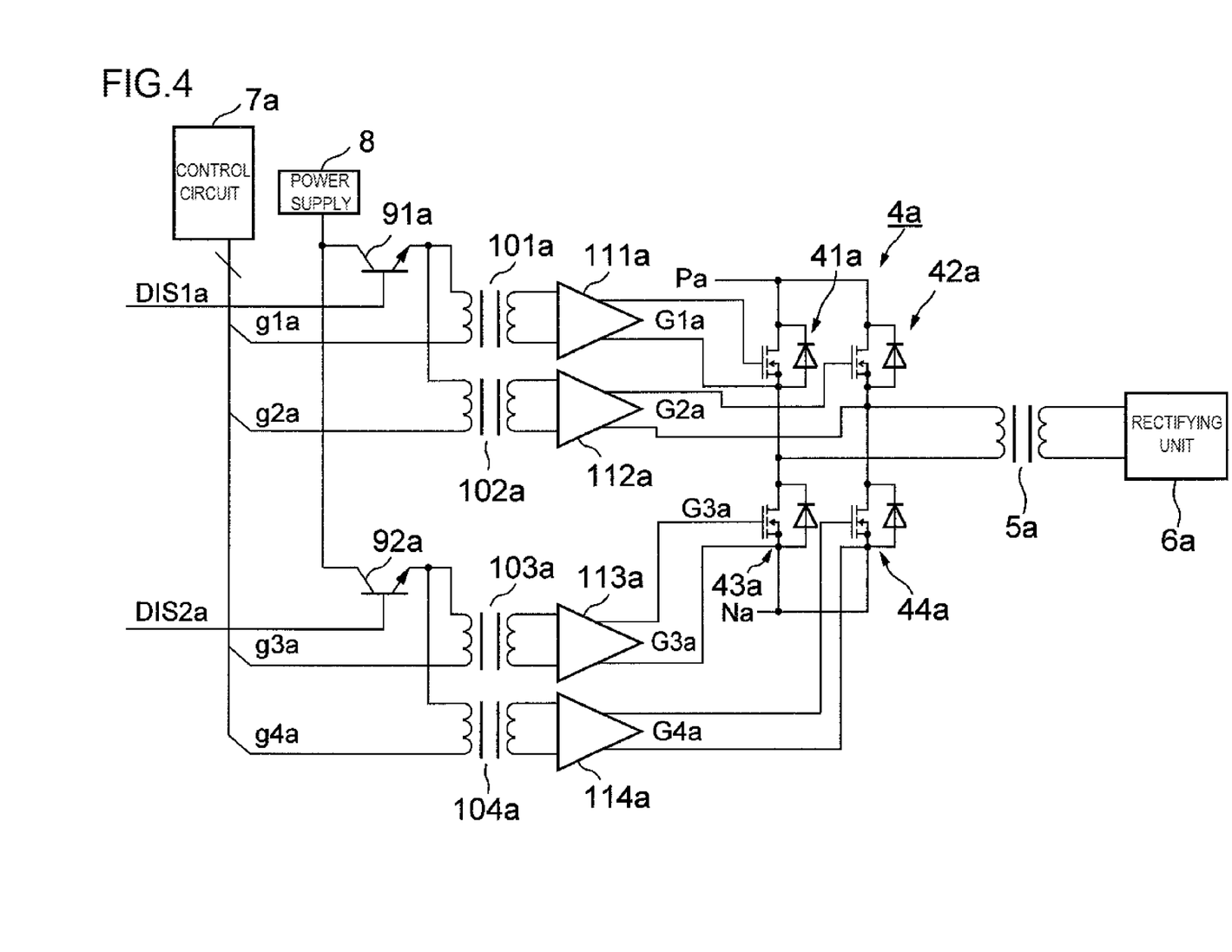
FIG. 4 is a circuit diagram showing a detailed configuration of an inverter and the like of the vehicle-mounted charger of the second embodiment.

FIG. 4 is a circuit diagram showing a configuration of the inverter 4a, the control circuit 7a, a power supply 8a, the transistors 91a and 92a, the pulse transformers 101a to 104a, and the gate drive circuits 111a to 114a in FIG. 3. A converter 3 of the stage before the inverter 4a is omitted from FIG. 4.

The converter 3 shown in FIG. 3 outputs direct current voltage between a high potential power supply line Pa and a low potential power supply line Na shown in FIG. 4. In FIG. 4, the inverter 4a is configured of upper arm switching elements 41a and 42a and lower arm switching elements 43a and 44a. Each of the upper arm switching elements 41a and 42a and lower arm switching elements 43a and 44a is configured of an n-channel FET and freewheeling diode connected to each other in anti-parallel. The drain of each n-channel FET in the upper arm switching elements 41a and 42a is connected to the high potential power supply line Pa, while the source of each n-channel FET in the lower arm switching elements 43a and 44a is connected to the low potential power supply line Na. Further, the sources of the n-channel FETs in the upper arm switching elements 41a and 42a are connected to the drains of the n-channel FETs in the lower arm switching elements 43a and 44a respectively, and these connection points are connected to a single-phase primary winding of the transformer 5a.

The control circuit 7a is a circuit that generates gate signals g1a to g4a, which form the basis of gate signals G1a to G4a supplied to the gates of the FETs of the upper arm switching elements 41a and 42a and lower arm switching elements 43a and 44a respectively.

The gate signals g1a to g4a are input by the control circuit 7a into primary side circuits including primary windings of the pulse transformers 101a to 104a respectively. To describe in further detail, one end of each of the primary windings of the pulse transformers 101a to 104a is connected to the end of the control circuit 7a that outputs the gate signals g1a to g4a. Also, the other end of each of the primary windings of the pulse transformers 101a and 102a is connected to the emitter of the NPN transistor 91a, while the other end of each of the primary windings of the pulse transformers 103a and 104a is connected to the emitter of the NPN transistor 92a. Further, the collectors of the transistors 91a and 92a are connected to the power supply 8. Also, a forced stop signal DIS1a is input into the base of the transistor 91a, and a forced stop signal DIS2a is input into the base of the transistor 92a. Herein, the transistor 91a (92a) is in an on-state when the forced stop signal DIS1a (DIS2a) is at a non-active level (an H level in this example), thus connecting the power supply 8 to the primary windings of the pulse transformers 101a and 102a (103a and 104a). Also, the transistor 91a (92a) is in an off-state when the forced stop signal DIS1a (DIS2a) is at an active level (an L level in this example), thus disconnecting the power supply 8 from the one end of the primary windings of the pulse transformers 101a and 102a (103a and 104a). In this way, the transistors 91a and 92a function as interruption control switching elements.

The gate drive circuits 111a to 114a are circuits that rectify alternating current voltage generated in secondary windings of the pulse transformers 101a to 104a respectively, and output the gate signals G1a to G4a obtained as a result of the rectification between the gates and sources of the n-channel FETs of the switching elements 41a to 44a respectively of the inverter 4a.

The above are the details of the configuration of the vehicle-mounted charger 1a according to this embodiment.

The same advantages as in the first embodiment are obtained in this embodiment too. Also, this embodiment is such that the number of transistors for carrying out opening and closing of the primary side circuits of the transformers 101a to 104a is reduced by providing the shared transistor 91a for the pulse transformers 101a and 102a corresponding to the upper arm switching elements 41a and 42a, and providing the shared transistor 92a for the pulse transformers 103a and 104a corresponding to the lower arm switching elements 43a and 44a. Consequently, in comparison with the first embodiment, the circuit scale can be reduced and the failure rate can be reduced.

Other Embodiments

Heretofore, first and second embodiments of the disclosure have been described, but other embodiments of the disclosure are conceivable. Examples are as follows.

(1) In the first and second embodiments, the configuration may be such that the forced stop signals DIS1 and DIS2 are generated when any of multiple kinds of differing event occurs.

(2) In the first and second embodiments, the disclosure is applied to a vehicle-mounted charger, but the disclosure is applicable not only to a vehicle-mounted charger, but also to a railroad car-mounted or aircraft-mounted charger.

Figure 5:
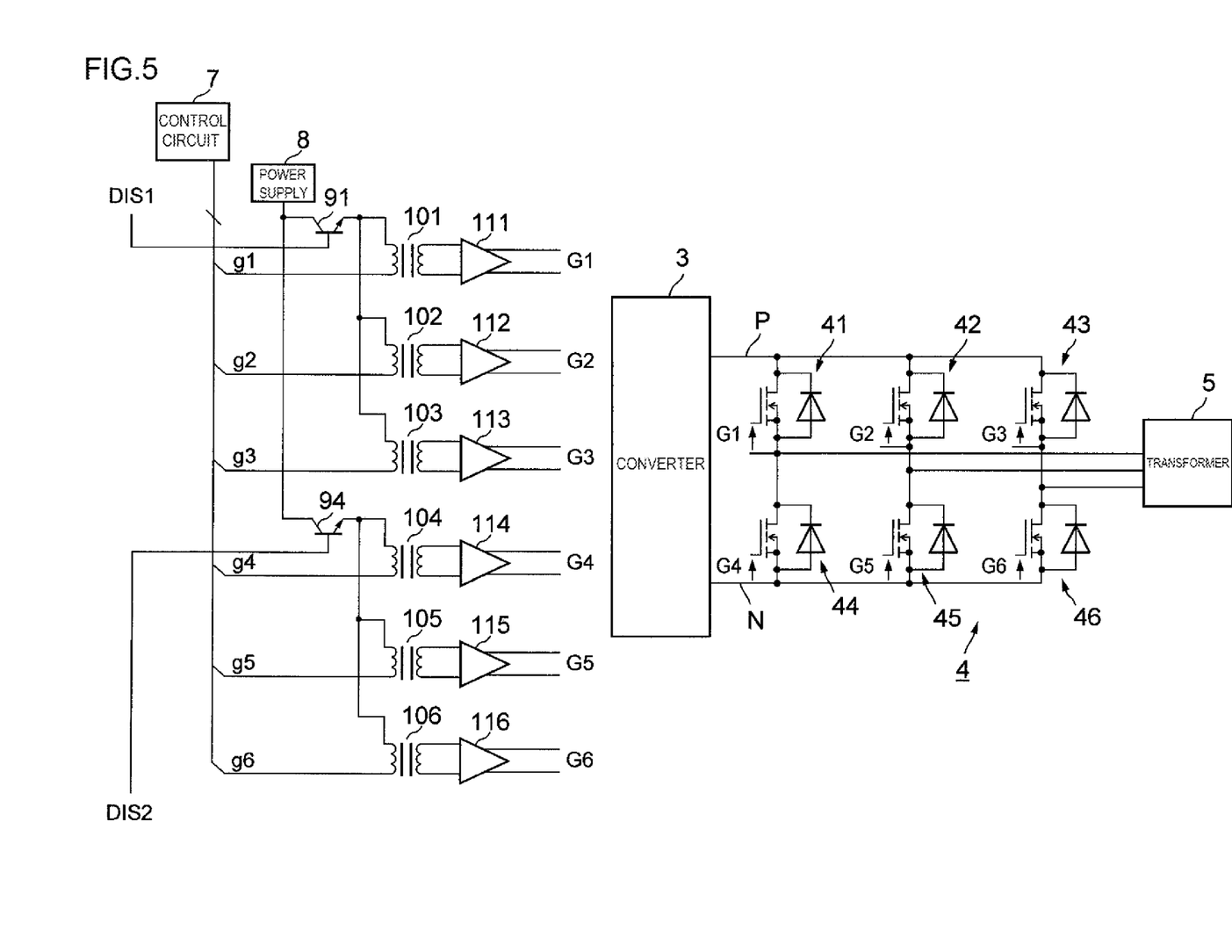
FIG. 5 is a circuit diagram showing a detailed configuration of an inverter and the like of a modification example of the vehicle-mounted charger that is the first embodiment of the disclosure.

(3) FIG. 5 is a circuit diagram showing a detailed configuration of an inverter and the like of a modification example of the vehicle-mounted charger that is the first embodiment of the disclosure. As shown in FIG. 5, the pulse transformers 101 to 103 may be connected to the power supply 8 via the shared transistor 91, and the pulse transformers 104 to 106 may be connected to the power supply 8 via the shared transistor 94. According to this aspect, the upper arm switching elements 41 to 43 can be turned off collectively by causing the transistor 91 to be turned off, while the lower arm switching elements 44 to 46 can be turned off collectively by causing the transistor 94 to be turned off.

Although embodiments have been shown and described, it would be appreciated by those skilled in the art that changes may be made in the embodiments without departing from the principles and spirit of the invention, the scope of which is defined in the claims and their equivalents.

REFERENCE SIGNS AND NUMERALS ARE AS FOLLOWS 1, 1a Vehicle-mounted charger
2 Alternating current power supply
3 Converter
4, 4a Inverter
41 to 43, 41a, 42a Upper arm switching element
44 to 46, 43a, 44a Lower arm switching element
5, 5a Transformer 6, 6a Rectifying unit
7, 7a Control circuit
8 Power supply
91 to 96, 91a, 92a Transistor
101 to 106, 101a to 104a Pulse transformer
111 to 116, 111a to 114a Gate drive circuit
P, Pa High potential power supply line
N, Na Low potential power supply line
g1 to g6, g1a to g4a, G1 to G6, G1a to G4a gate signal
DIS1 and DIS2, DIS1a and DIS2a Forced stop signal.

What is claimed is:

1. A charger configured to generate alternating current voltage and to generate direct current voltage for charging a storage battery by rectifying the alternating current voltage, the charger comprising:
   a control circuit configured to output a plurality of gate signals;
   a plurality of transformers respectively including a plurality of primary side circuits, each of the plurality of primary side circuits including a primary winding and a plurality of secondary windings, the plurality of primary side circuits coupled to the control circuit to receive the plurality of gate signals, respectively, and the plurality of secondary windings generating voltages based on the plurality of gate signals respectively;
   a plurality of gate drive circuits coupled to the plurality of transformers and configured to provide output signals based on the voltages generated in the secondary windings of the plurality of transformers based on the plurality of gate signals, respectively, output by the control circuit;
   an inverter including a plurality of switching elements coupled to the plurality of gate drive circuits, to receive the output signals provided by the plurality of gate drive circuits, respectively, the plurality of switching elements being opened and closed based on the output signals, the gate signals output by the control circuit corresponding to the output signals received by the switching elements of the inverter; and
   an interruption control switching element configured to open and close at least one of the primary side circuits, and configured to switch the at least one of the primary side circuits to an open state in accordance with a forced stop signal, so that the plurality of transformers do not receive the plurality of gate signals and do not generate voltages based on the gate signals when the forced stop signal is generated, and the switching elements do not receive the output signals from the gate drive circuits.

2. The charger according to claim 1, wherein the at least one of the plurality of primary side circuits includes a circuit formed by the primary winding of one transformer of the plurality of transformers, the control circuit and the interruption control switching element being connected in series to each other and to a direct current power supply.

3. The charger according to claim 1, wherein
   each of the plurality of switching elements of the inverter includes a field effect transistor,
   each of the plurality of gate drive circuits outputs, as the output signal, a respective direct current signal, and
   each respective direct current signal is obtained by rectifying alternating current voltage, generated in the secondary winding of one transformer of the plurality of transformers, between a gate and source of the field effect transistor of one of the plurality of switching elements of the inverter.

4. The charger according to claim 1, wherein
   the interruption control switching element is one among a plurality of interruption control switching elements included in the charger,
   each of the plurality of primary side circuits includes a respective one of the plurality of interruption control switching elements, and
   for each primary side circuit of the plurality of primary side circuits, the respective interruption control switching element is configured to open and close the corresponding primary side circuit, and switch the corresponding primary side circuits to an open state in accordance with the forced stop signal.

5. The charger according to claim 4, wherein
   a first forced stop signal controls each interruption control switching element of one portion of the plurality of interruption control switching elements, and
   a second forced stop signal controls each interruption control switching element of another portion of the plurality of interruption control switching elements.

6. The charger according to claim 1, wherein
   the interruption control switching element is one among a plurality of interruption control switching elements included in the charger,
   the plurality of primary side circuits are divided into a plurality of groups,
   each of the plurality of groups includes at least one of the plurality of interruption control switching element, and
   for each group of the plurality of groups, the respective at least one interruption control switching element is configured to open and close each primary side circuit thereof, and switch each primary side circuit thereof to an open state in accordance with the forced stop signal.

7. The charger according to claim 6, wherein
   the plurality of groups includes a first group and a second group,
   the at least one interruption control switching element for the first group is controlled by a first forced stop signal, and
   the at least one interruption control switching element for the second group is controlled by a second forced stop signal.

8. The charger according to claim 1, wherein
   the plurality of switching elements of the inverter include a plurality of upper arm switching elements connected to a high potential power supply line and a plurality of lower arm switching elements connected to a low potential power supply line, and
   the charger further comprises
     at least one upper arm interruption control switching element configured to carry out opening and closing of the primary side circuit of each transformer corresponding to the plurality of upper arm switching elements, and switch open the primary side circuit of each transformer corresponding to the plurality of upper arm switching elements in accordance with a first forced stop signal, and
     at least one lower arm the interruption control switching element configured to carry out opening and closing of the primary side circuit of each transformer corresponding to the plurality of lower arm switching elements, and switch the primary side circuit of each transformer corresponding to the plurality of lower arm switching elements in accordance with a second forced stop signal.

9. The charger according to claim 1, wherein the forced stop signal is provided from an exterior of the charger.

10. The charger according to claim 1, wherein the forced stop signal is generated by an occurrence of any one of a plurality of kinds of events.

11. A charger configured to charge a storage, comprising:
a control circuit configured to output a plurality of gate signals;
a plurality of transformers having primary side circuits configured to receive the plurality of gate signals, respectively, and to output respective voltages based on the plurality of gate signals;
a plurality of gate drive circuits, coupled to the plurality of transformers, respectively, configured to provide output signals respectively corresponding to the output voltages of the plurality of transformers, which correspond to the gate signals output by the control circuit;
an inverter including a plurality of switching elements; coupled to the gate drive circuits, respectively, to receive the output signals corresponding to the output voltages and to open and close the plurality of switching elements based on the output signals, the gate signals output by the control circuit corresponding to the output signals received by the switching elements of the inverter; and
an interruption control switching element configured to open and close at least one of the primary side circuits to switch the at least one of the primary side circuits to an open state based on a forced stop signal, so that the plurality of transformers do not receive the plurality of gate signals and do not generate voltages based on the gate signals when the forced stop signal is received, and the switching elements of the inverter do not receive the output signals from the gate drive circuits.

* * * * *

UNITED STATES PATENT AND TRADEMARK OFFICE
CERTIFICATE OF CORRECTION

PATENT NO. : 10,644,526 B2
APPLICATION NO. : 15/176649
DATED : May 5, 2020
INVENTOR(S) : Hirokazu Tajima et al.

Page 1 of 1

It is certified that error appears in the above-identified patent and that said Letters Patent is hereby corrected as shown below:

In the Claims

Column 11, Line 16, In Claim 11, delete "elements;" and insert -- elements --, therefor.

Signed and Sealed this
Fourth Day of August, 2020

Andrei Iancu
*Director of the United States Patent and Trademark Office*